(12) United States Patent
Brooks

(10) Patent No.: US 6,442,642 B1
(45) Date of Patent: Aug. 27, 2002

(54) SYSTEM AND METHOD FOR PROVIDING AN IMPROVED SYNCHRONOUS OPERATION OF AN ADVANCED PERIPHERAL BUS WITH BACKWARD COMPATIBILITY

(75) Inventor: John Milford Brooks, San Diego, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/410,167

(22) Filed: Sep. 30, 1999

(51) Int. Cl.[7] .............................................. G06F 13/00
(52) U.S. Cl. ........................ 710/305; 710/105; 710/315
(58) Field of Search ................................ 710/305–317, 710/105

(56) References Cited

U.S. PATENT DOCUMENTS

| | | | |
|---|---|---|---|
| 5,987,218 A | * 11/1999 | Sawada et al. | 358/1.15 |
| 6,064,626 A | * 5/2000 | Stevens | 365/189.04 |
| 6,154,803 A | * 11/2000 | Pontius et al. | 710/104 |
| 6,260,093 B1 | * 7/2001 | Gehman et al. | 710/113 |

FOREIGN PATENT DOCUMENTS

EP   0817096 A2   1/1998   ............ G06F/15/78

OTHER PUBLICATIONS

AMBA Specification (Rev. 2.0) ARM IHI 0011A 1999, pp. ii–3–49.

David Flynn: "AMBA: Enabling Reusable On–Chip Designs" IEEE Micro, Jul.–Aug. 1997, IEEE, USA vol. 17, No. 4, pp. 20–27, XP000658531 ISSN: 0272–1732 p. 22, left–hand column, paragraph –p. 24, left–hand column, paragraph 6.

International Search Report in PCT Application No. PCT/US00/26576 dated Jan. 26, 2001.

* cited by examiner

Primary Examiner—Rupal Dharia
(74) Attorney, Agent, or Firm—Foley & Lardner (57) ABSTRACT

An electronic bridge for providing a first electronic device attached to a high-data throughput bus and a second electronic device attached to a peripheral bus. The bridge further has an output bus circuit for generating output bus signals onto the peripheral bus, the output bus comprising a peripheral data bus a peripheral address bus. The bridge also has an output size signal circuit for generating output size signals for indicating the number of bits being used for a data transfer over the peripheral data bus, and an output control signal circuit for generating a output control signals onto the peripheral bus. The plurality of output control signals comprise, a PWRITE write control signal for indicating whether a write operation is occurring, a continuous PCLK clock signal having a rising edge and a falling edge for controlling the transfer of data over the lower-speed peripheral bus, and one or more PSELx signals for indicating the particular cycle of the PCLK signal in which data is to be transferred over the lower-speed peripheral bus. A corresponding slave apparatus for transferring digital data from a first electronic device attached to a high-data throughput bus through an electronic bridging device to a lower-speed peripheral bus. The slave apparatus has an input bus for receiving a plurality of output bus signals from the peripheral bus, an input size signal circuit for receiving output size signals for indicating the number of bits being used for a data transfer over the peripheral data bus, and an input control signal circuit for receiving input control signals from the peripheral bus.

19 Claims, 6 Drawing Sheets

SYSTEM AND METHOD FOR PROVIDING AN IMPROVED SYNCHRONOUS OPERATION OF AN ADVANCED PERIPHERAL BUS WITH BACKWARD COMPATIBILITY

TECHNICAL FIELD

This invention relates in general to a system for providing an improved Advanced Peripheral Bus, and more particularly to system for providing an improved synchronous operation of an advanced peripheral bus with backward compatibility.

BACKGROUND OF THE INVENTION

The Advanced Microcontroller Bus Architecture (AMBA) specification defines an on-chip communications standard for designing high-performance embedded microcontrollers. Three distinct buses are defined within the AMBA specification: an Advanced High-performance Bus (AHB), an Advanced System Bus (ASB), and an Advanced Peripheral Bus (APB).

The AMBA AHB is for high-performance, high clock frequency system modules. The AHB acts as the high-performance system backbone bus. AHB supports the efficient connection of processors, on-chip memories and off-chip external memory interfaces with low-power peripheral macrocell functions. AHB is also specified to ensure ease of use in an efficient design flow using synthesis and automated test techniques.

The AMBA ASB is for high-performance system modules. AMBA ASB is an alternative system bus suitable for use where the high-performance features of AHB are not required. ASB also supports the efficient connection of processors, on-chip memories and off-chip external memory interfaces with low-power peripheral macrocell functions.

The AMBA APB is for low-power peripherals. AMBA APB is optimized for minimal power consumption and reduced interface complexity to support peripheral functions. APB can be used in conjunction with either version of the system bus.

Figure 1:
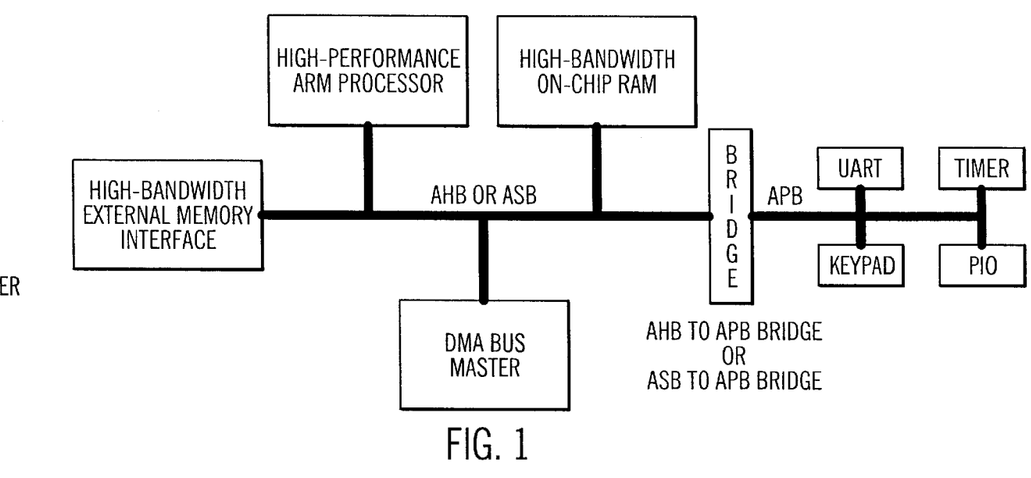
FIG. 1 illustrates a system block diagram for a processing system using both an AHB and an APB bus according to an embodiment of the present invention.

An AMBA-based microcontroller typically consists of a high-performance system backbone bus (AMBA AHB or AMBA ASB), able to sustain the external memory bandwidth, on which the CPU, on-chip memory and other Direct Memory Access (DMA) devices reside. This bus provides a high-bandwidth interface between the elements that are involved in the majority of transfers. Also located on the high-performance bus is a bridge to the lower bandwidth APB, where most of the peripheral devices in the system are located (see FIG. 1).

The APB provides the basic peripheral macrocell communications infrastructure as a secondary bus from the higher bandwidth pipelined main system bus. Such peripherals typically have interfaces which are memory-mapped registers, have no high-bandwidth interfaces, and are accessed under programmed control. The external memory interface is application-specific and may only have a narrow data path, but may also support a test access mode which allows the internal AMBA AHB, ASB and APB modules to be tested in isolation with system-independent test sets.

AHB is a later generation of AMBA bus which is intended to address the requirements of high-performance synthesizable designs. It is a high-performance system bus that supports multiple bus masters and provides high-bandwidth operation. The AHB implements the features required for high-performance, high clock frequency systems including burst transfers, split transactions, single-cycle bus master handover, single-clock edge operation, non-tristate implementation, and wider data bus configurations (64/128 bits). Bridging between this higher level of bus and the current ASB/APB can be done efficiently to ensure that any existing designs can be easily integrated.

An AHB design may contain one or more bus masters, typically a system would contain at least the processor and test interface. However, it would also be common for a Direct Memory Access (DMA) or Digital Signal Processor (DSP) to be included as bus masters. The external memory interface, APB bridge and any internal memory are the most common AHB slaves. Any other peripheral in the system could also be included as an AHB slave. However, low-bandwidth peripherals typically reside on the APB.

A typical AHB system design contains the following components: an AHB master, an AHB slave, an AHB arbiter, and an AHB decoder. A bus master is able to initiate read and write operations by providing an address and control information. Only one bus master is allowed to actively use the bus at any one time. A bus slave responds to a read or write operation within a given address-space range. The bus slave signals back to the active master the success, failure or waiting of the data transfer. The bus arbiter ensures that only one bus master at a time is allowed to initiate data transfers. Even though the arbitration protocol is fixed, any arbitration algorithm, such as highest priority or fair access can be implemented depending on the application requirements. An AHB would include only one arbiter, although this would be trivial in single bus master systems. The AHB decoder is used to decode the address of each transfer and provide a select signal for the slave that is involved in the transfer. A single centralized decoder is required in all AHB implementations.

A typical ASB system may contain one or more bus masters. For example, at least the processor and test interface. However, it would also be common for a Direct Memory Access (DMA) or Digital Signal Processor (DSP) to be included as bus masters. The external memory interface, APB bridge and any internal memory are the most common ASB slaves. Any other peripheral in the system could also be included as an ASB slave. However, low-bandwidth peripherals typically reside on the APB.

An ASB system design typically contains the following components: an ASB master, an ASB slave, an ASB decoder, and an ASB arbiter. A bus master is able to initiate read and write operations by providing an address and control information. Only one bus master is allowed to actively use the bus at any one time. A bus slave responds to a read or write operation within a given address-space range. The bus slave signals back to the active master the success, failure or waiting of the data transfer. The bus decoder performs the decoding of the transfer addresses and selects slaves appropriately. The bus decoder also ensures that the bus remains operational when no bus transfers are required. A single centralized decoder is required in all ASB implementations. The bus arbiter ensures that only one bus master at a time is allowed to initiate data transfers. Even though the arbitration protocol is fixed, any arbitration algorithm, such as highest priority or fair access can be implemented depending on the application requirements. An ASB would include only one arbiter, although this would be trivial in single bus master systems.

The APB is part of the AMBA hierarchy of buses and is optimized for minimal power consumption and reduced interface complexity. The APB appears as a local secondary bus that is encapsulated as a single AHB or ASB slave device. APB provides a low-power extension to the system bus which builds on AHB or ASB signals directly. The APB bridge appears as a slave module which handles the bus handshake and control signal retiming on behalf of the local peripheral bus. By defining the APB interface from the starting point of the system bus, the benefits of the system diagnostics and test methodology can be exploited. The APB is typically used to interface to any peripherals which are low bandwidth.

An APB implementation typically contains a single APB bridge which is required to convert AHB or ASB transfers into a suitable format for the slave devices in the APB. The bridge provides latching of all address, data and control signals, as well as providing a second level of decoding to generate slave select signals for the APB peripherals. All other modules on the APB are APB slaves. The APB slaves have the following interface specification: address and control valid throughout the access (unpipelined), zero-power interface during non-peripheral bus activity (peripheral bus is static when not in use), timing can be provided by decode with strobe timing (unclocked interface), and write data valid for the whole access (allowing glitch-free transparent latch implementations).

The AHB signal list is described below in Table 1. All signals are prefixed with the letter H, ensuring that the AHB signals are differentiated from other similarly named signals in a system design.

TABLE 1

| AMBA AHB signals | | |
| --- | --- | --- |
| HCLK - Bus clock | Clock source | This clock times all bus transfers. All signal timings are related to the rising edge of HCLK. |
| HRESETn - Reset | Reset controller | The bus reset signal is active LOW and is used to reset the system and the bus. This is the only active LOW signal. |
| HADDR[31:0] - Address bus | Master | The 32-bit system address bus. |
| HTRANS[1:0] - Transfer type | Master | Indicates the type of the current transfer, which can be NONSEQUENTIAL, SEQUENTIAL, IDLE or BUSY. |
| HWRITE - Transfer direction | Master | When HIGH this signal indicates a write transfer and when LOW a read transfer. |
| HSIZE[2:0] - Transfer size | Master | Indicates the size of the transfer, which is typically byte (8-bit), halfword (16-bit) or word (32-bit). The protocol allows for larger transfer sizes up to a maximum of 1024 bits. |
| HBURST[2:0] - Burst type | Master | Indicates if the transfer forms part of a burst. Four, eight and sixteen beat bursts are supported and the burst may be either incrementing or wrapping. |
| HPROT[3:0] - Protection control | Master | The protection control signals provide additional information about a bus access and are primarily intended for use by any module that wishes to implement some level of protection. The signals indicate if the transfer is an opcode fetch or data access, as well as if the transfer is a privileged mode access or user mode access. For bus masters with a memory management unit these signals also indicate whether the current access is cacheable or bufferable. |
| HWDATA[31:0] - Write data bus | Master | The write data bus is used to transfer data from the master to the bus slaves during write operations. A minimum data bus width of 32 bits is recommended. However, this may easily be extended to allow for higher bandwidth operation. |
| HSELx - Slave select | Decoder | Each AHB slave has its own slave select signal and this signal indicates that the current transfer is intended for the selected slave. This signal is simply a combinatorial decode of the address bus. |
| HRDATA[31:0] - Read data bus | Slave | The read data bus is used to transfer data from bus slaves to the bus master during read operations. A minimum data bus width of 32 bits is recommended. However, this may easily be extended to allow for higher bandwidth operation. |
| HREADY - Transfer done | Slave | When HIGH the HREADY signal indicates that a transfer has finished on the bus. This signal may be driven LOW to extend a transfer. Note: Slaves on the bus require HREADY as both an input and an output signal. |
| HRESP[1:0] - Transfer response | Slave | The transfer response provides additional information on the status of a transfer. Four different responses are provided, OKAY, ERROR, RETRY and SPLIT. |

An AHB also has a number of signals required to support multiple bus master operation (see Table 2). Many of these arbitration signals are dedicated point to point links and in Table 2 the suffix x indicates the signal is from module X.

For example, there will be a number of HBUSREQx signals in a system, such as HBUSREQarm, HBUSREQdma and HBUSREQtic.

TABLE 2

Arbitration signals

| Signal | Source | Description |
| --- | --- | --- |
| HBUSREQx - Bus request | Master | A signal from bus master x to the bus arbiter which indicates that the bus master requires the bus. There is an HBUSREQx signal for each bus master in the system, up to a maximum of 16 bus masters. |
| HLOCKx - Locked transfers | Master | When HIGH this signal indicates that the master requires locked access to the bus and no other master should be granted the bus until this signal is LOW. |
| HGRANTx - Bus grant | Arbiter | This signal indicates that bus master x is currently the highest priority master. Ownership of the address/control signals changes at the end of a transfer when HREADY is HIGH, so a master gets access to the bus when HREADY and HGRANTx are HIGH. |
| HMASTER[3:0] - Master number | Arbiter | These signals from the arbiter indicate which bus master is currently performing a transfer and is used by the slaves which support SPLIT transfers to determine which master is attempting an access. The timing of HMASTER is aligned with the timing of the address and control signals. |
| HMASTLOCK - Locked sequence | Arbiter | Indicates that the current master is performing a locked sequence of transfers. This signal has the same timing as the HMASTER signal. |
| HSPLITx[15:0] - Split completion request | Slave (SPLIT-capable) | This 16-bit split bus is used by a slave to indicate to the arbiter which bus masters should be allowed to re-attempt a split transaction. Each bit of this split bus corresponds to a single bus master. |

TABLE 3 the AMBA ASB signals.

| Signal | Description |
| --- | --- |
| AGNTx - Bus grant | A signal from the bus arbiter to a bus master x which indicates that the bus master will be granted the bus when BWAIT is LOW. There is an AGNTx signal for each bus master in the system, as well as an associated bus request signal, AREQx. |
| AREQx - Bus request | A signal ftom bus master x to the bus arbiter which indicates that the bus master requires the bus. There is an AREQX signal for each bus master in the system, as well as an associated bus grant signal, AGNTx. |
| BA[31:0] - Address bus | The system address bus, which is driven by the active bus master. |
| BCLK - Bus clock | This clock times all bus transfers. Both the LOW phase and HIGH phase of BCLK are used to control transfers on the bus. |
| BD[31:0] - Data bus | This is the bidirectional system data bus. The data bus is driven by the current bus master during write transfers and by the selected bus slave during read transfers. |
| BERROR - Error response | A transfer error is indicated by the selected bus slave using the BERROR signal. When BERROR is HIGH a transfer error has occurred, when BERROR is LOW then the transfer is successful. This signal is also used in combination with the BLAST signal to indicate a bus retract operation. When no slave is selected this signal is driven by the bus decoder. |
| BLAST - Last response | This signal is driven by the selected bus slave to indicate if the current transfer should be the last of a burst sequence. When BLAST is HIGH the decoder must allow sufficient time for address decoding. When BLAST is LOW, the next transfer may continue a burst sequence. This signal is also used in combination with the BERROR signal to indicate a bus retract operation. When no slave is selected this signal is driven by the bus decoder. |
| BLOK - Locked transfers | When HIGH this signal indicates that the current transfer and the next transfer are to be indivisible and no other bus master should be given access to the bus. This signal is used by the bus arbiter. This signal is driven by the active bus master. |
| BnRES - Reset | The bus reset signal is active LOW and is used to reset the system and the bus. This is the only active LOW signal. |

TABLE 3-continued the AMBA ASB signals.

| | |
|---|---|
| BPROT[1:0] - Protection control | The protection control signals provide additional information about a bus access and are primarily intended for use by a bus decoder when acting as a basic protection unit. The signals indicate if the transfer is an opcode fetch or data access, as well as if the transfer is a privileged mode access or user mode access. The signals are driven by the active bus master and have the same timing as the address bus. |
| BSIZE[1:0] - Transfer size | The transfer size signals indicate the size of the transfer, which may be byte, halfword or word. The signals are driven by the active bus master and have the same timing as the address bus. |
| BTRAN[1:0] - Transfer type | These signals indicate the type of the next transaction, which may be ADDRESS-ONLY, NONSEQUENTIAL or SEQUENTIAL. These signals are driven by a bus master when the appropriate AGNTx signal is asserted. |
| BWAIT - Wait response | This signal is driven by the selected bus slave to indicate if the current transfer may complete. If BWAIT is HIGH a further bus cycle is required, if BWAIT is LOW then the transfer may complete in the current bus cycle. When no slave is selected this signal is driven by the bus decoder. |
| BWRITE - Transfer direction | When HIGH this signal indicates a write transfer and when LOW a read transfer. This signal is driven by the active bus master and has the same timing as the address bus. |
| DSELx - Slave select | A signal from the bus decoder to a bus slave x which indicates that the slave device is selected and a data transfer is required. There is a DSELx signal for each ASB bus slave. |

All AMBA APB signals use the single letter P prefix. Some APB signals, such as the clock, may be connected directly to the system bus equivalent signal. Table 4 shows the list of AMBA APB signal names, along with a description of how each of the signals is used.

TABLE 4 the AMBA APB signals

| | |
|---|---|
| PCLK - Bus clock | The rising edge of PCLK is used to time all transfers on the APB. |
| PRESETn - APB reset | The APB bus reset signal is active LOW and this signal will normally be connected directly to the system bus reset signal. |
| PADDR[31:0] - APB address bus | This is the APB address bus, which may be up to 32-bits wide and is driven by the peripheral bus bridge unit. |
| PSELx - APB select | A signal from the secondary decoder, within the peripheral bus bridge unit, to each peripheral bus slave x. This signal indicates that the slave device is selected and a data transfer is required. There is a PSELx signal for each bus slave. |
| PENABLE - APB strobe | This strobe signal is used to time all accesses on the peripheral bus. The enable signal is used to indicate the second cycle of an APB transfer. The rising edge of PENABLE occurs in the middle of the APB transfer. |
| PWRITE - APB transfer direction | When HIGH this signal indicates an APB write access and when LOW a read access. |
| PRDATA - APB read data bus | The read data bus is driven by the selected slave during read cycles (when PWRITE is LOW). The read data bus can be up to 32-bits wide. |
| PWDATA - APB write data bus | The write data bus is driven by the peripheral bus bridge unit during write cycles (when PWRITE is HIGH). The write data bus can be up to 32-bits wide. |

The APB operation can be described using the following: a state diagram, write transfer operation, and a read transfer operation. The state diagram, shown in FIG. 2, can be used to represent the activity of the peripheral bus. Operation of the state machine is through the three states: Idle, Setup, and Enable. The Idle is the default state for the peripheral bus. The Setup state occurs when a transfer is required. The bus moves into the setup state from the Idle state, where the appropriate select signal, PSELx, is asserted. The bus only remains in the setup state for one clock cycle and will always move to the enable state on the next rising edge of the clock.

Figure 2:
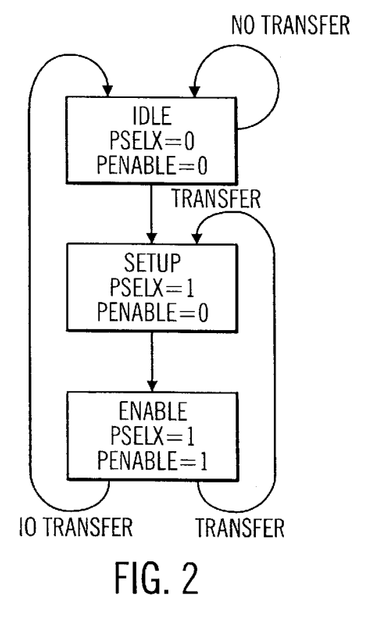
FIG. 2 illustrates a state diagram for operation an APB bus according to another embodiment of the present invention.

In the enable state the enable signal, PENABLE is asserted. The address, write and select signals all remain stable during the transition from the setup to enable state. The enable state also only lasts for a single clock cycle and after this state the bus will return to the idle state if no further transfers are required. Alternatively, if another transfer is to follow then the bus will move directly to the setup state. It is acceptable for the address, write and select signals to glitch during a transition from the enable to setup states.

Figure 3:
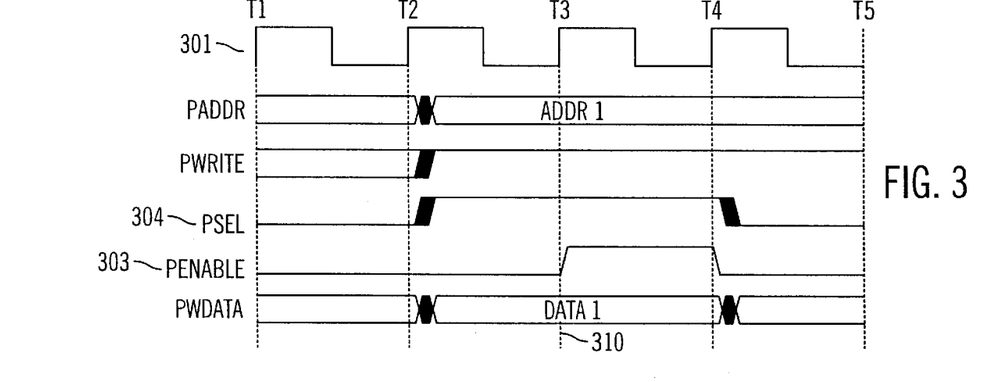
FIG. 3 illustrates a timing diagram for a write operation on a typical APB bus.

The basic write transfer is shown in FIG. 3. The write transfer starts with the address, write data, write signal and select signal all changing after the rising edge of the clock. The first clock cycle of the transfer is called the setup cycle. After the following clock edge the enable signal PENABLE is asserted, and this indicates that the enable cycle is taking place. The address, data and control signals all remain valid throughout the enable cycle. The transfer completes at the end of this cycle. The enable signal, PENABLE, will be de-asserted at the end of the transfer. The select signal will also go LOW, unless the transfer is to be immediately followed by another transfer to the same peripheral. In order to reduce power consumption the address signal and the write signal will not change after a transfer until the next access occurs. The protocol only requires a clean transition on the enable signal. It is possible that in the case of back to back transfers the select and write signals may glitch.

Figure 4:
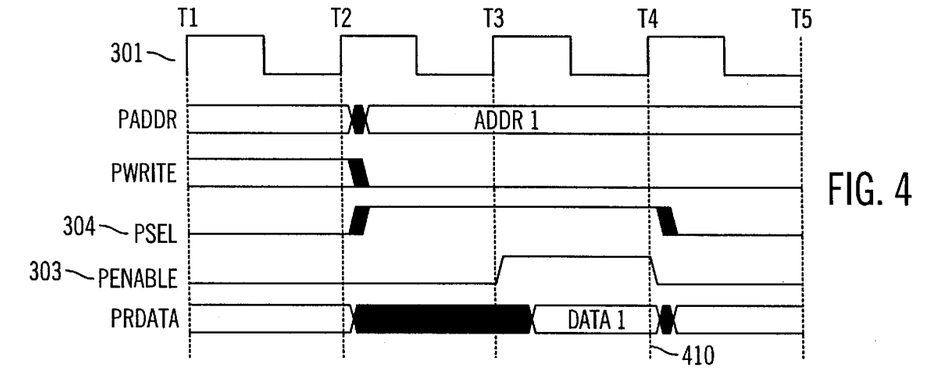
FIG. 4 illustrates timing diagram for a read operation on a typical APB bus.
Figure 5:
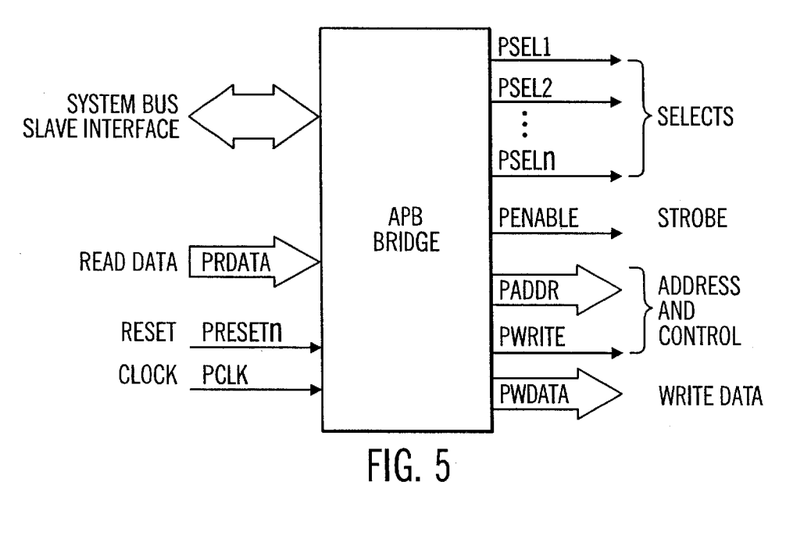
FIG. 5 illustrates a block diagram for a typical an APB bridge that operates on an APB bus.

FIG. 4 shows a read transfer. The timing of the address, write, select and strobe signals are all the same as for the write transfer. In the case of a read, the slave must provide the data during the enable cycle. The data is sampled on the rising edge of clock at the end of the enable cycle. The APB bridge is the only bus master on the APB. In addition, the APB bridge is also a slave on the higher-level system bus. FIG. 5 shows the APB signal interface of an APB bridge. The bridge unit converts system bus transfers into APB transfers and performs the following functions: latches the address and holds it valid throughout the transfer, decodes the address and generates a peripheral select, PSELx. Only one select signal can be active during a transfer, drives the data onto the APB for a write transfer, drives the APB data onto the system bus for a read transfer, and generates a timing strobe, PENABLE, for the transfer.

Figure 6:
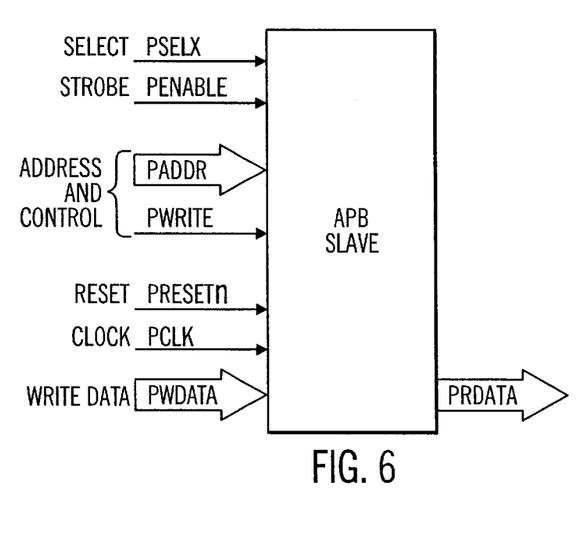
FIG. 6 illustrates a block diagram for a typical an APB slave device that operates on an APB bus.

APB slaves have a simple, yet flexible, interface. The exact implementation of the interface will be dependent on the design style employed and many different options are possible. FIG. 6 shows the signal interface of an APB slave. The APB slave interface is very flexible. For a write transfer the data can be latched at the following points: on either rising edge of PCLK, when PSEL is HIGH and on the rising edge of PENABLE, when PSEL is HIGH. The select signal PSELx, the address PADDR and the write signal PWRITE 902 can be combined to determine which register should be updated by the write operation. For read transfers the data can be driven on to the data bus when PWRITE 902 is LOW and both PSELx and PENABLE are high.

Figure 7:
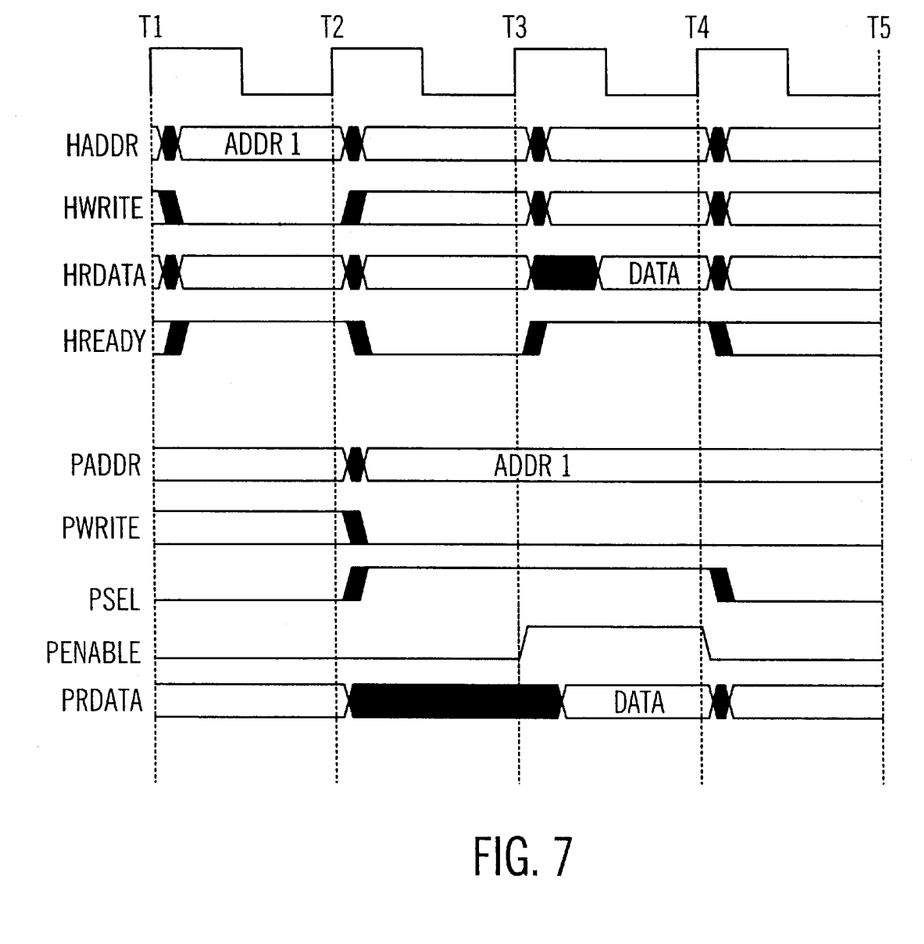
FIG. 7 illustrates a timing diagram for a write operation on a across a typical AHB to APB bus system.

Interfacing the APB to the AHB is comprises read transfers operations, write transfers operations, back to back transfers operation, and tristate data bus implementations. FIG. 7 illustrates a read transfer. The transfer starts on the AHB at time T1 and the address is sampled by the APB bridge at T2. If the transfer is for the peripheral bus then this address is broadcast and the appropriate peripheral select signal is generated. This first cycle on the peripheral bus is called the setup cycle, this is followed by the enable cycle, when the PENABLE signal is asserted. During the enable cycle the peripheral must provide the read data. Normally it will be possible to route this read data directly back to the AHB, where the bus master can sample it on the rising edge of the clock at the end of the enable cycle, which is at time T4 in FIG. 7.

The above definition of the APB bus possesses a few deficiencies when used in higher-data throughput environments. One of the modules on an AHB bus of a system is a DMA controller. Typically, a DMA controller will transfer data one data block per clock cycle in a contiguous block of data. From the timing for the APB bus, a data transfer requires two clock cycles within the operation of the APB bus. Therefore, the AHB bus side of the system will operate with a data rate of twice the rate of the APB bus. This fact limits the data throughput from an AHB side of a system to an APB side of a system. Additionally, the APB bus is defined to transfer a 32 bit word during each read or write operation. This fact also limits the flexibility of the data transfer system for data between devices on the AHB side of a system and a APB side of a system.

Finally, the above definition of the APB bus utilizes the non-continuous signal PENABLE to latch data transfers into APB slave devices. Systems which utilize advanced test methodologies typically use synchronous designs with all logic events occurring relative to a continuous clock signal. At the same time, the power consumed by peripheral devices is highly dependent upon the clock rate for the system clock used to control the operation of the peripheral devices. Because the peripheral devices are typically designed to be lower-power devices, the clock controlling its operation needs to be a slow as possible. The use of the highest speed clock PCLK that matches the high speed BCLK signal would lead to excessive power consumption for peripheral devices.

SUMMARY OF THE INVENTION

To overcome the limitations in the prior art described above, and to overcome other limitations that will become apparent upon reading and understanding the present specification, the present invention discloses a system for providing an improved synchronous operation of an advanced peripheral bus with backward compatibility.

The present invention solves the above-described problems by providing an electronic bridge apparatus for providing a first electronic device attached to a high-data throughput bus and a second electronic device attached to a lower-speed peripheral bus. The electronic bridge apparatus comprises an input bus circuit for receiving a plurality of input bus signals from the high-data throughput bus, the plurality of input bus signals comprise a multi-bit system data bus and a multi-bit system address bus and an input control signal circuit for receiving a plurality of input control signals from the high-data throughput bus, the plurality of input control signals comprises a continuous input BCLK clock signal. The bridge further comprises an output bus circuit for generating a plurality of output bus signals onto the lower-speed peripheral bus, the plurality of output bus signals comprise a multi-bit peripheral data bus and a multi-bit peripheral address bus, an output size signal circuit for generating one or more output size signals for indicating the number of bits being used for a data transfer over the multi-bit peripheral data bus, and an output control signal circuit for generating a plurality of output control signals onto the lower-speed peripheral bus. The plurality of output control signals comprise a PWRITE 902 write control signal for indicating whether a write operation is occurring, a continuous PCLK signal 903 having a rising edge and a falling edge for controlling the transfer of data over the lower-speed peripheral bus, and one or more PSELx signals for indicating the particular cycle of the PCLK signal 903 in which data is to be transferred over the lower-speed peripheral bus. Data is transferred into the second electronic device over the multi-bit peripheral data bus on the rising edge of the PCLK signal 903 during a clock cycle when the PSELx signal 904 is in an active state and the PWRITE signal 902 is in an active state.

Another aspect of the present invention is a slave apparatus for transferring digital data from a first electronic device attached to a high-data throughput bus through an electronic bridging device to a lower-speed peripheral bus. The slave apparatus comprises an input bus circuit for receiving a plurality of output bus signals from the lower-speed peripheral bus, the plurality of output bus signals comprise a multi-bit peripheral data bus and a multi-bit peripheral address bus, an input size signal circuit for receiving one or more output size signals for indicating the number of bits being used for a data transfer over the multi-bit peripheral data bus, and an input control signal circuit for receiving a plurality of input control signals from the lower-speed peripheral bus. The plurality of input control signals comprise a PWRITE write control signal 902 for indicating whether a write operation is occurring, a continuous PCLK clock signal having a rising edge and a falling edge for controlling the transfer of data over the lower-speed peripheral bus, and one or more PSELx signals for indicating the particular cycle of the PCLK signal in which data is to be transferred over the lower-speed peripheral bus. Data is transferred into the slave apparatus over the multi-bit peripheral data bus on the rising edge of the PCLK signal during a clock cycle when the PSELx signal is in an active state and the PWRITE signal 902 is in an active state.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION

In general terms, the present invention relates to providing a system for providing an improved Advanced Peripheral Bus within a computing -system. More specifically, the present invention relates to providing system for providing an improved synchronous operation of an advanced peripheral bus with backward compatibility with existing devices.

Figure 8:
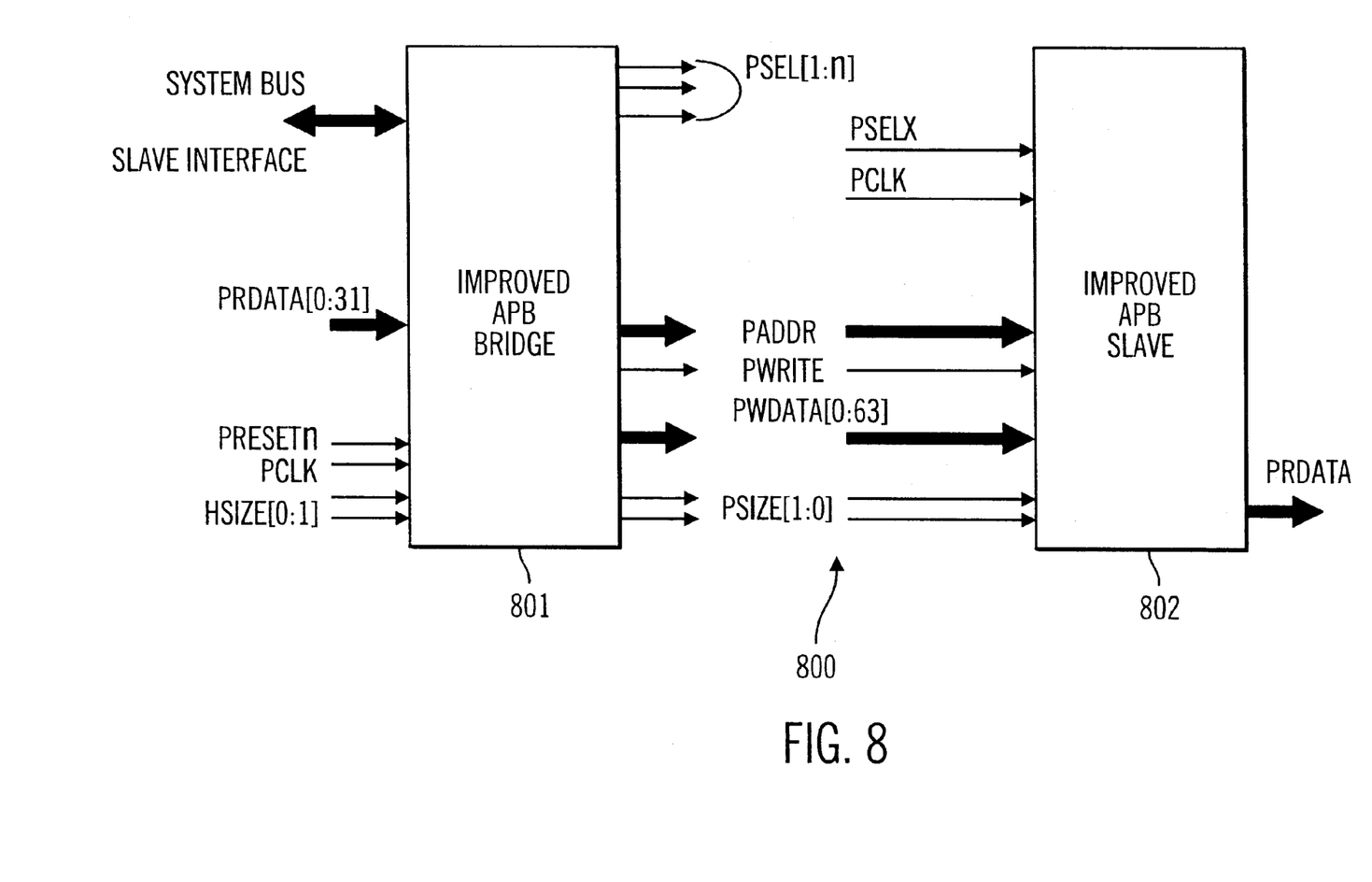
FIG. 8 illustrates a block diagram for a typical APB bridge and an APB slave device that operates on an improved APB bus according to an embodiment of the present invention.

FIG. 8 illustrates a block diagram for an improved APB bus 800 with its associated improved APB bridge 801 and improved APB slave device interface 802. The bus possesses the following signals: PSEL[1:n] 810, PCLK 813, PADDR [0:31], PWRITE, PRDATA[0:63], and PSIZE[1:0]. For an individual slave device 802, the PSELx signal 811 is used from the set of signals PSEL[1:n] to select the particular slave device.

To address the deficiency in a typical APB bus that limits the data throughput between an AHB device and an APB device, the width of the data bus PWDATA[0:63] has been increased in size to 64 bits. With the increased width, a DMA controller on the AHB side of a system can transfer 32 bit words each clock cycle and have the APB bus match its data transfer rate using the extra 32 bits to account for the fact that the APB bus operates at a rate one half of the AHB bus. Throughput is increased because not only is the width of the PWDATA[0:63] data increased to 64 bits, but an APB transfer takes only 1 cycle instead of 2.

In addition, the PSIZE[1:0] 817 signals have been added to the APB bus to permit the bus to transfer data in 8, 16, 32, and 64 bit widths. The data transfer word sizes corresponding to the value of the PSIZE signals is shown in Table 5. These signals on a APB side of a bridge 801 may be generated from a BSIZE[1:0] set of signal present on the AHB bus.

TABLE 5

| Data Transfer Word Size | |
|---|---|
| PSIZE[1:0] Bits | Data Transfer Word Size |
| 00 | 8 bits |
| 01 | 16 bits |
| 10 | 32 bits |
| 11 | 64 bits |

These two additions to an APB bus add flexibility and increased performance as measured in added data throughput capacity for the improved APB bus. At the same time, older APB bus based peripherals will continue to operate with the improved APB bus. The older peripherals will simply ignore the signals present on the PSIZE bus lines and continue to transfer data in fixed 32 bit words. Programmable devices controlling the actions on the bus may be set to access these older peripherals using only 32 bit words. Since the data will be transmitted over PWDATA[31:0], the peripheral and the programmable devices may ignore any signal activity on the added upper portion of the data bus. Therefore, these improvements to an APB bus are backward compatible with the existing bus.

Figure 9:
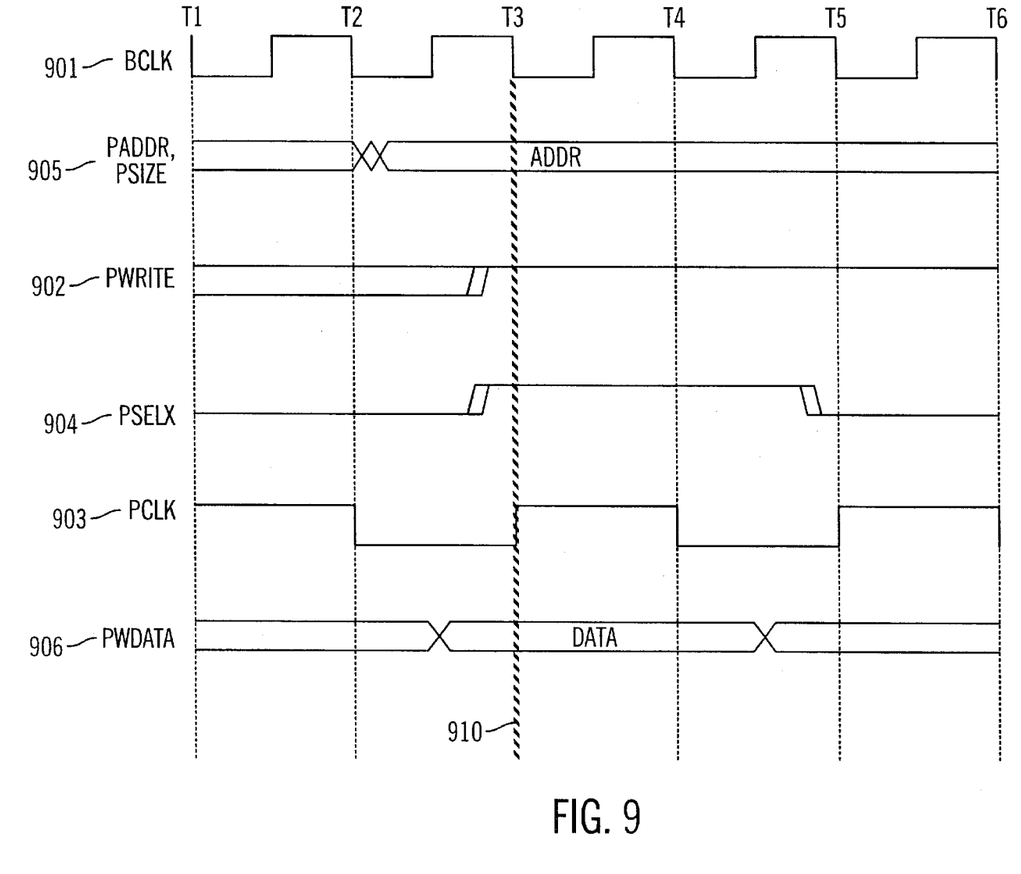
FIG. 9 illustrates a timing diagram for a write operation on an improved APB bus according to an embodiment of the present invention.
Figure 10:
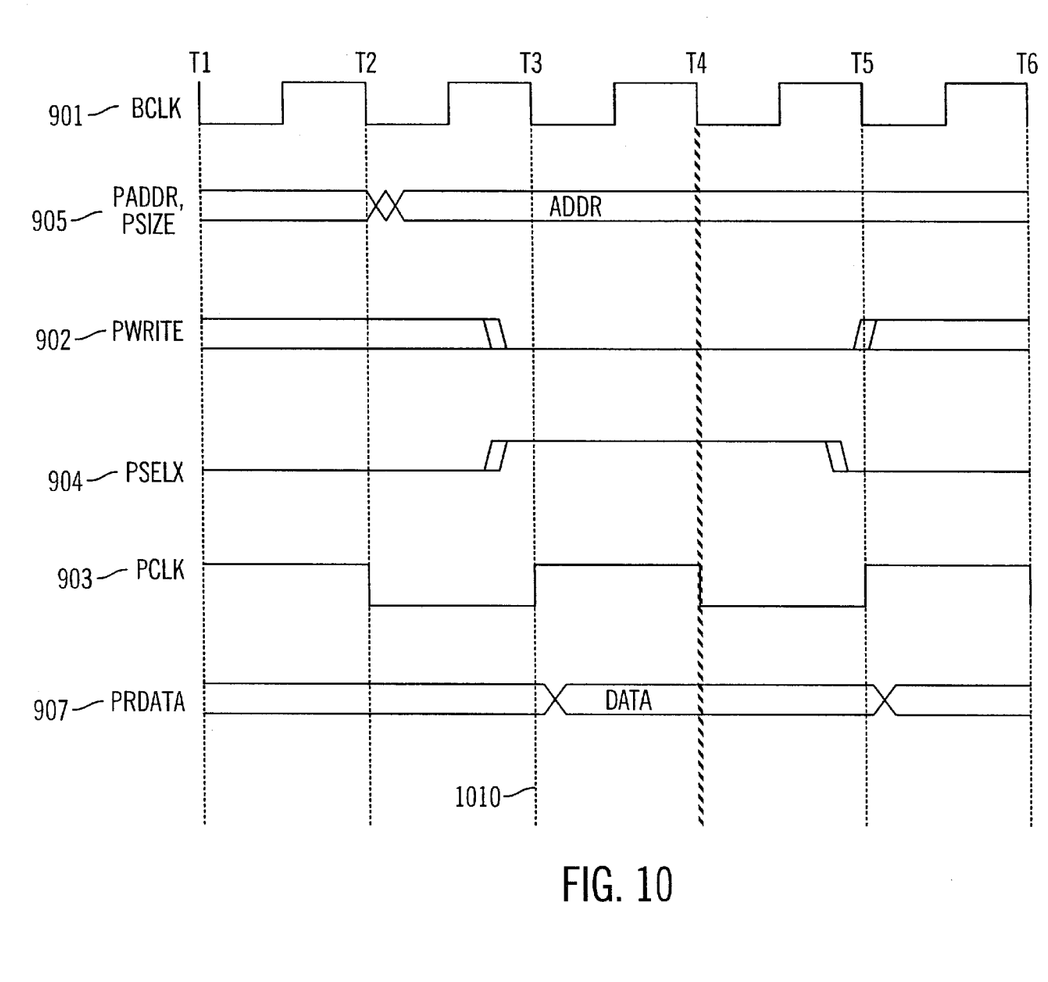
FIG. 10 illustrates a timing diagram for a read operation on an improved APB bus according to an embodiment of the present invention.

FIGS. 9 and 10 illustrate the write and read timing for the improved APB bus according to an example embodiment of the present invention. In the improved bus design, the PENABLE signal 302 has been replaced with a continuous clock signal, PCLK 903. The PCLK 903 signal is one half the clock rate of the base bus clock BECLK 901. The bus design has been changed from a latched-based design in which data is read from or written over the bus when both PSEL 303 and PENABLE 302 are active to a synchronous, clocked register-based design in which data is transferred on an edge of the PCLK signal 903 during the clock cycle in which the PSEL signal 904 is active.

Consider the data write operation performed during the timing sequence illustrated in FIG. 9. The timing sequence is referenced to a sequence of clock cycles for the high rate base clock BCLK 901. Each clock cycle T1, T2, through T6 begin on the falling edge of BCLK 901. In T1, the PCLK signal 903 is HIGH and the data transfer operation is beginning. At T2, PCLK 903 changes to LOW and the PADDR bus 905 becomes active. Sometime after T2, but before T3, the PWRITE 902 and PWDATA 906 busses become valid. During this same time period, the PSELx 904 signal becomes active for the peripheral device being selected to receive the data. The PSELx 904 signal is valid before T3 occurs.

At T3, the PWDATA 906 and PADDR 905 busses are stable and the data may be sampled off the bus. T3 corresponds to the rising edge of PCLK 903 during the cycle of PCLK 903 in which PSELx 904 is active. The PCLK 903 clock signal may be used as a clock signal for the registers clocking data off the bus. Also, the PCLK 903 signal is one half the clock rate of the base bus clock BCLK 901. As such, the power consumption for circuit within the peripheral devices on the APB bus will be lower as power consumed by a device increases with the clock rate used by the circuit.

By comparing the timing shown in FIG. 9 with the timing shown in FIG. 3, the data is sampled off of the bus at the same point in time in the data transfer timing cycle; however, this operation occurs using a continuous clock signal PCLK 903 rather than a strobing PENABLE 303 pulse. The PCLK 903 signal may also be used to operate all other elements within the circuits and ensure the operation be synchronous with a common clocking signal.

FIG. 10 illustrates the data read operation performed during the timing sequence according to the present invention. Once again, the PCLK signal 903 replaces the PENABLE signal 303. It is a continuous clock signal as discussed above. The read operation begins at T1 in the same manner discussed above with respect to the write operation. After T2, the PADDR bus 905 and control signals PWRITE 902 and PSELx 904 become valid. T3 once again occurs on the rising edge of PCLK 903.

In the existing APB bus, the PENABLE 303 enables the read data onto the bus sometime after T3 where the data is latched off the bus with the falling edge of PENABLE 303. This occurs at approximately T4 410 as shown in FIG. 4. In the improved APB design, this point in time also occurs at T4 FIG. 10 on the falling edge of PCLK 303 during the only cycle of PCLK 303 in which the PSELx 904 is also active. The read operation possesses the same benefits with respect to synchronous operation as discussed above with respect to the write operation timing.

The change in the operation of the PENABLE 303 signal to the PCLK 903 signal is also backward compatible with existing APB peripheral designs in that the current bus design requires the peripheral devices to latch data on the specified edge of PENABLE 303 only when the PSELx 304 signal is active. Because the PENABLE signal 303 is only active for a given peripheral device when PSELx 304 is active the same timing is realized if the PENABLE 303 signal is replaced with the PCLK 903 signal. The PSELx 904 signal will control the determination of when data is to be read and written off the data bus.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. An electronic bridge apparatus for providing a first electronic device attached to a high-data throughput bus and a second electronic device attached to a lower-speed peripheral bus, the electronic bridge apparatus comprises:

an input bus circuit for receiving a plurality of input bus signals from the high-data throughput bus, the plurality of input bus signals comprise a multi-bit system data bus and a multi-bit system address bus;

an input control signal circuit for receiving a plurality of input control signals from the high-data throughput bus, the plurality of input control signals comprises a continuous input BCLK clock signal;

an output bus circuit for generating a plurality of output bus signals onto the lower-speed peripheral bus, the plurality of output bus signals comprise a multi-bit peripheral data bus and a multi-bit peripheral address bus;

an output size signal circuit for generating one or more output size signals for indicating the number of bits being used for a data transfer over the multi-bit peripheral data bus;

an output control signal circuit for generating a plurality of output control signals onto the lower-speed peripheral bus, the plurality of output control signals comprise, a PWRITE write control signal for indicating whether a write operation is occurring, a continuous PCLK clock signal having a rising edge and a falling edge for controlling the transfer of data over the lower-speed peripheral bus, and one or more PSELx signals for indicating the particular cycle of the PCLK signal in which data is to be transferred over the lower-speed peripheral bus; and wherein data is transferred into the second electronic device over the multi-bit peripheral data bus on the rising edge of the PCLK signal during a clock cycle when the PSELx signal is in an active state and the PWRITE signal is in an active state.

2. The electronic bridge apparatus according to claim 1, wherein:

the multi-bit peripheral data bus comprises a multi-bit, bi-directional data bus; and data is transferred from the second electronic device to the bridging apparatus over the multi-bit peripheral data bus on the falling edge of the PCLK signal during a clock cycle when the PSELx signal is in an active state and the PWRITE signal is in an inactive state.

3. The electronic bridge apparatus according to claim 2, wherein the BCLK signal is twice the frequency of the PCLK signal.

4. The electronic bridge apparatus according to claim 3, wherein the BCLK signal is a 100 MHz clock signal.

5. The electronic bridge apparatus according to claim 2, wherein the multi-bit peripheral data bus comprises a 64 bit data bus.

6. The electronic bridge apparatus according to claim 5, wherein the plurality of PSIZE signals comprise a first PSIZE signal and a second PSIZE signal for indicating data transfers of 8, 16, 32, and 64 bits.

7. The electronic bridge apparatus according to claim 6, wherein:

an 8 bit data transfer occurs over the multi-bit peripheral data bus when the first PSIZE signal and the second PSIZE signals are LOW;

a 16 bit data transfer occurs over the multi-bit peripheral data bus when the first PSIZE signal is HIGH and the second PSIZE signals is LOW;

an 32 bit data transfer occurs over the multi-bit peripheral data bus when the first PSIZE signal is LOW and the second PSIZE signals is HIGH; and an 64 bit data transfer occurs over the multi-bit peripheral data bus when the first PSIZE signal and the second PSIZE signals are HIGH.

8. The electronic bridge apparatus according to claim 6, wherein the multi-bit peripheral data bus is twice the number of bits as the multi-bit system data bus.

9. The electronic bridge apparatus according to claim 2, wherein plurality of input control signals comprises:

a one or more HSIZE signals for indicating the size of the data transfer over multi-bit system data bus; and a BRST reset signal for initiating a reset of all devices attached to the multi-bit system data bus.

10. The electronic bridge apparatus according to claim 2, wherein plurality of input control signals comprises:

a one or more HSIZE signals for indicating the size of the data transfer over multi-bit system data bus; and a BRST reset signal for initiating a reset of all devices attached to the multi-bit system data bus.

11. The electronic bridge apparatus according to claim 2, wherein plurality of output control signals comprises a PRST reset signal for initiating a reset of all devices attached to the multi-bit peripheral data bus.

12. A slave apparatus for transferring digital data from a first electronic device attached to a high-data throughput bus through an electronic bridging device to a lower-speed peripheral bus, the slave apparatus comprises:

an input bus circuit for receiving a plurality of output bus signals from the lower-speed peripheral bus, the plurality of output bus signals comprise a multi-bit peripheral data bus and a multi-bit peripheral address bus;

an input size signal circuit for receiving one or more output size signals for indicating the number of bits being used for a data transfer over the multi-bit peripheral data bus;

an input control signal circuit for receiving a plurality of input control signals from the lower-speed peripheral bus, the plurality of input control signals comprise, a PWRITE write control signal for indicating whether a write operation is occurring, a continuous PCLK clock signal having a rising edge and a falling edge for controlling the transfer of data over the lower-speed peripheral bus, and one or more PSELx signals for indicating the particular cycle of the PCLK signal in which data is to be transferred over the lower-speed peripheral bus; and wherein data is transferred into the slave apparatus over the multi-bit peripheral data bus on the rising edge of the PCLK signal during a clock cycle when the PSELx signal is in an active state and the PWRITE signal is in an active state.

13. The slave apparatus according to claim 12, wherein:

the multi-bit peripheral data bus comprises a multi-bit, bi-directional data bus; and data is transferred from the slave apparatus to the bridging apparatus over the multi-bit peripheral data bus on the falling edge of the PCLK signal during a clock cycle when the PSELx signal is in an active state and the PWRITE signal is in an inactive state.

14. The slave apparatus according to claim 13, wherein the BCLK signal is twice the frequency of the PCLK signal.

15. The slave apparatus according to claim 14, wherein the BCLK signal is a 100 MHz clock signal.

16. The slave apparatus according to claim 13, wherein the multi-bit peripheral data bus comprises a 64 bit data bus.

17. The slave apparatus according to claim 16, wherein the plurality of PSIZE signals comprise a first PSIZE signal and a second PSIZE signal for indicating data transfers of 8, 16, 32, and 64 bits.

18. The slave apparatus according to claim 17, wherein:

an 8 bit data transfer occurs over the multi-bit peripheral data bus when the first PSIZE signal and the second PSIZE signals are LOW;

a 16 bit data transfer occurs over the multi-bit peripheral data bus when the first PSIZE signal is HIGH and the second PSIZE signals is LOW;

an 32 bit data transfer occurs over the multi-bit peripheral data bus when the first PSIZE signal is LOW and the second PSIZE signals is HIGH; and an 64 bit data transfer occurs over the multi-bit peripheral data bus when the first PSIZE signal and the second PSIZE signals are HIGH.

19. The slave apparatus according to claim 12, wherein plurality of input control signals comprises a PRST reset signal for initiating a reset of all devices attached to the multi-bit peripheral data bus.

* * * * *